United States Patent
Kino et al.

(10) Patent No.: US 8,514,323 B2
(45) Date of Patent: Aug. 20, 2013

(54) IMAGING APPARATUS AND IMAGING METHOD

(75) Inventors: Tatsuya Kino, Sagamihara (JP); Yukihiro Naito, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 0 days.

(21) Appl. No.: 13/616,953

(22) Filed: Sep. 14, 2012

(65) Prior Publication Data

US 2013/0010182 A1   Jan. 10, 2013

Related U.S. Application Data

(63) Continuation of application No. PCT/JP2012/055828, filed on Mar. 7, 2012.

(30) Foreign Application Priority Data

Jun. 21, 2011   (JP) .................................. 2011-137762

(51) Int. Cl.
   *H04N 5/235*   (2006.01)
(52) U.S. Cl.
   USPC ........................ 348/364; 348/362; 348/222.1
(58) Field of Classification Search
   USPC ...................................... 348/222.1, 362, 364
   See application file for complete search history.

(56) References Cited

U.S. PATENT DOCUMENTS

| | | | | |
|---|---|---|---|---|
| 7,092,019 | B1 * | 8/2006 | Ogata et al. | 348/263 |
| 2008/0095408 | A1 * | 4/2008 | Yokohata et al. | 382/106 |
| 2010/0271512 | A1 * | 10/2010 | Garten | 348/239 |
| 2010/0328482 | A1 * | 12/2010 | Chang et al. | 348/222.1 |

FOREIGN PATENT DOCUMENTS

| | | |
|---|---|---|
| JP | 2000-314582 | 12/2000 |
| JP | 2008-277896 | 11/2008 |
| JP | 2009-159092 | 7/2009 |
| JP | 2009-194700 | 8/2009 |

OTHER PUBLICATIONS

PCT/ISA/210, "International Search Report" for PCT/JP2012/055828, mailed Jun. 17, 2012 (2 pgs.) with partial translation (1 pg.).
PCT/ISA/210, "International Search Report" for PCT/JP2012/055828, mailed Jun. 17, 2012 (in Japanese) (2 pgs.).
PCT/ISA/237, "Written Opinion of the International Searching Authority" for PCT/JP2012/055828, mailed Jun. 17, 2012 (in Japanese) (3 pgs.).
"Notice of Allowance" for corresponding Japanese Patent Application No. 2011-137762 (in Japanese) (3 pgs.).

* cited by examiner

*Primary Examiner* — Tuan Ho
*Assistant Examiner* — Angel L Garces-Rivera
(74) *Attorney, Agent, or Firm* — John C. Pokotylo; Straub & Pokotylo

(57) ABSTRACT

An imaging unit obtains image data. An imaging controller controls the imaging unit to obtain a plurality of pieces of image data having different exposure values. A standard image decision unit decides the image data with the shortest length of exposure time of the plurality of pieces of image data as standard image data. A correlation quantity detection unit detects a correlation quantity between the standard image data and the plurality of pieces of image data. A first combination processing unit generates first combined image data by combining the plurality of pieces of image data in accordance with the correlation quantity. A second combination processing unit combines the standard image data and the first combined image data.

4 Claims, 5 Drawing Sheets

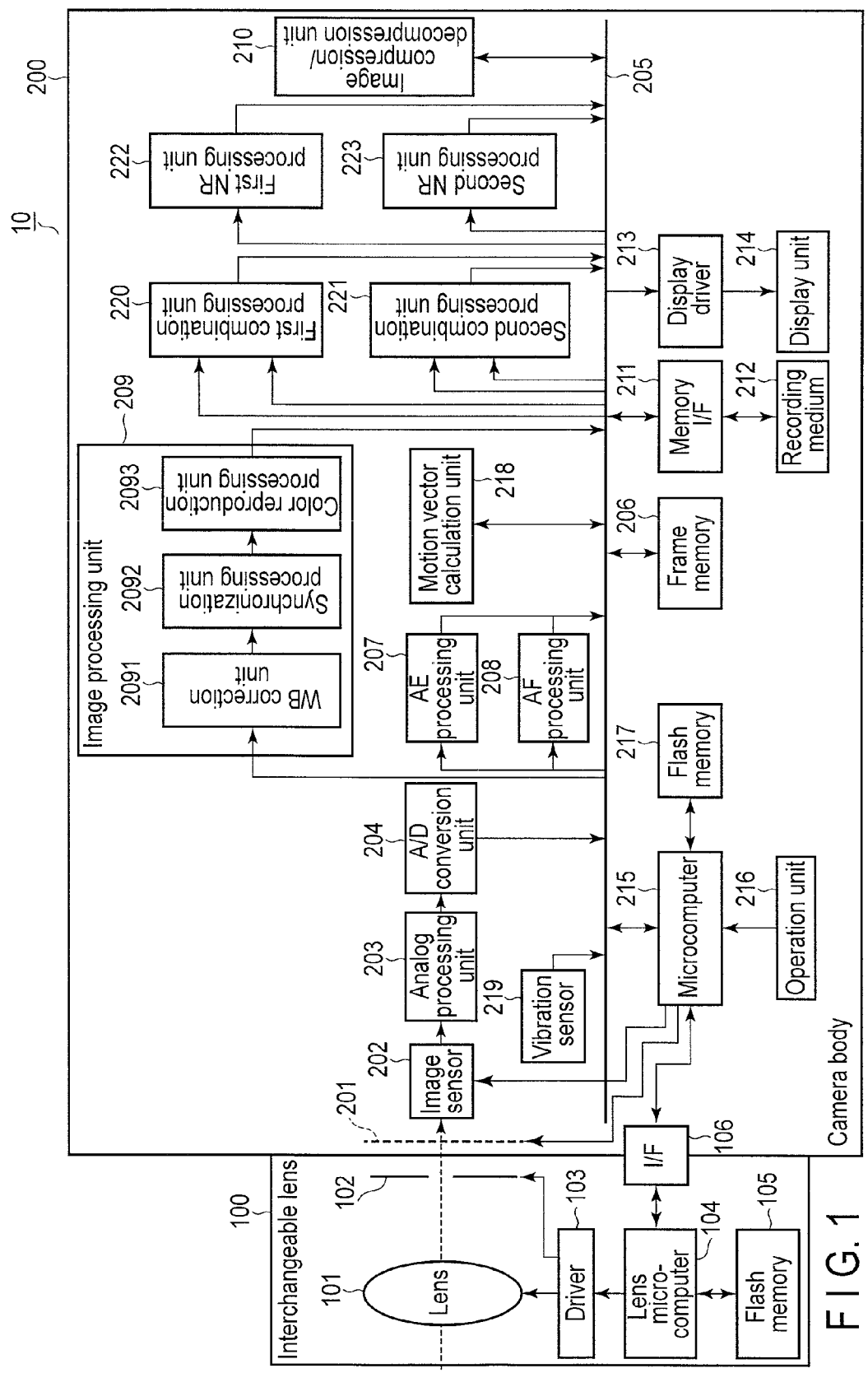
F I G. 1

IMAGING APPARATUS AND IMAGING METHOD

CROSS-REFERENCE TO RELATED APPLICATIONS

This application is a Continuation Application of PCT Application No. PCT/JP2012/055828, filed Mar. 7, 2012 and based upon and claiming the benefit of priority from prior Japanese Patent Application No. 2011-137762, filed Jun. 21, 2011, the entire contents of all of which are incorporated herein by reference.

BACKGROUND OF THE INVENTION

1. Field of the Invention

The present invention relates to an imaging apparatus and an imaging method.

2. Description of the Related Art

A technology seeking to reduce noise or expand the dynamic range by combining a plurality of pieces of image data obtained by a plurality of exposures has been known. When a plurality of pieces of image data are combined, if camera shake or subject blurring has occurred, the plurality of pieces of image data cannot be correctly combined. As a method of combining a plurality of pieces of image data even when camera shake or subject blurring has occurred, there has been known a method in which a certain piece of image data from the plurality of pieces of image data is selected as standard image data and the plurality of pieces of image data are combined while aligning image data by using the standard image data as a standard (see, for example, Jpn. Pat. Appln. KOKAI Publication No. 2009-194700).

BRIEF SUMMARY OF THE INVENTION

According to a first aspect of the invention, there is provided an imaging apparatus comprising: an imaging unit that obtains image data by photoelectrically converting light received through an imaging lens; an imaging controller that controls the imaging unit to obtain a plurality of pieces of image data having different exposure values by causing the imaging unit to successively perform a plurality of exposures in a plurality of different lengths of exposure time; a standard image decision unit that decides one piece of image data from the plurality of pieces of image data having different exposure values as standard image data; a correlation quantity detection unit that detects a correlation quantity between the standard image data and the image data of the plurality of pieces of image data having different exposure values excluding the standard image data; a first combination processing unit that generates first combined image data by combining the plurality of pieces of image data having different exposure values in accordance with the correlation quantity detected by the correlation quantity detection unit by using the standard image data decided by the standard image decision unit as a standard; and a second combination processing unit that combines the standard image data and the first combined image data, wherein the standard image decision unit decides the image data with the shortest length of exposure time of the plurality of pieces of image data having different exposure values as the standard image data.

According to a second aspect of the invention, there is provided an imaging method comprising:

obtaining a plurality of pieces of image data having different exposure values by causing an imaging unit to successively perform a plurality of exposures in a plurality of different lengths of exposure times by an imaging controller; deciding the image data with the shortest length of exposure time of the plurality of pieces of image data having different exposure values obtained by the imaging unit as standard image data by a standard image decision unit; detecting a correlation quantity between the standard image data and the image data of the plurality of pieces of image data having different exposure values excluding the standard image data by a correlation quantity detection unit; generating first combined image data by combining the plurality of pieces of image data having different exposure values in accordance with the correlation quantity detected by the correlation quantity detection unit by using the standard image data decided by the standard image decision unit as a standard by a first combination processing unit; and combining the standard image data and the first combined image data by a second combination processing unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera as an example of an imaging apparatus according to each embodiment of the present invention;

DETAILED DESCRIPTION OF THE INVENTION

Figure 2:
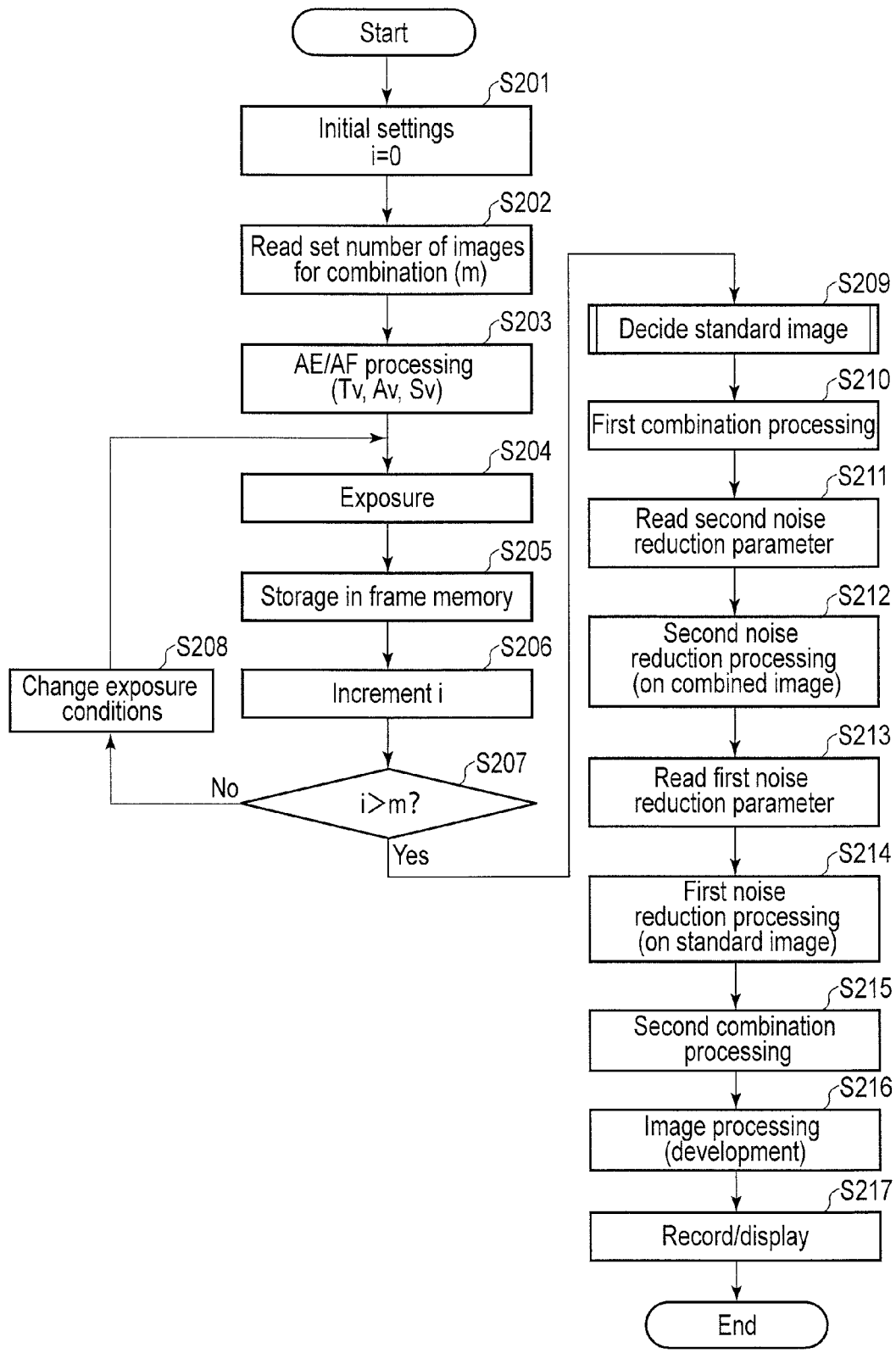
FIG. 2 is a flow chart showing a photographing operation of the digital camera as an example of an imaging method according to a first embodiment of the present invention.

The embodiments of the present invention will be described below with reference to the drawings.

[First Embodiment]

FIG. 1 is a block diagram showing the configuration of a digital camera as an example of an imaging apparatus according to each embodiment of the present invention. A digital camera 10 shown in FIG. 1 is a digital camera with interchangeable lenses. However, the digital camera 10 does not necessarily need to be a digital camera with interchangeable lenses and may be a lens-integrated digital camera.

The digital camera 10 shown in FIG. 1 includes an interchangeable lens 100 and a camera body 200. The interchangeable lens 100 is configured to be freely detachable from the camera body 200. When the interchangeable lens 100 is attached to the camera body 200, the interchangeable lens 100 is freely communicably connected to the camera body 200. Accordingly, the interchangeable lens 100 becomes operable under the control of the camera body 200.

The interchangeable lens 100 includes an imaging lens 101, a diaphragm 102, a driver 103, a lens microcomputer 104, and a flash memory 105.

The imaging lens 101 is an optical system to condense luminous fluxes from a subject (not shown) onto an image sensor 202 inside the camera body 200. The imaging lens 101 includes a plurality of lenses such as a focusing lens and a zoom lens.

The diaphragm 102 is configured to be freely closable and adjusts the quantity of incident luminous fluxes via the imaging lens 101. The driver 103 includes a motor or the like. The driver 103 drives a focusing lens or zoom lens inside the imaging lens 101 in the optical axis direction thereof or drives the diaphragm 102 to open or close under the control of the lens microcomputer 104.

The lens microcomputer 104 is freely communicably connected to a microcomputer 215 inside the camera body 200 via an interface (I/F) 106 when the interchangeable lens 100 is attached to the camera body 200. The lens microcomputer 104 drives the driver 103 under the control of the microcomputer 215. The lens microcomputer 104 also communicates lens information of the interchangeable lens 100 and the like stored in the flash memory 105 to the microcomputer 215 via the I/F 106.

The flash memory 105 stores lens information such as aberration information of the imaging lens 101 and programs necessary to perform an operation of the interchangeable lens 100.

The camera body 200 includes a mechanical shutter 201, the image sensor 202, an analog processing unit 203, an analog/digital (A/D) conversion unit 204, a bus 205, a frame memory 206, an AE processing unit 207, an AF processing unit 208, an image processing unit 209, an image compression/decompression unit 210, a memory interface (I/F) 211, a recording medium 212, a display driver 213, a display unit 214, the microcomputer 215, an operation unit 216, a flash memory 217, a motion vector calculation unit 218, a vibration sensor 219, a first combination processing unit 220, a second combination processing unit 221, a first noise reduction (NR) processing unit 222, and a second noise reduction (NR) processing unit 223.

The mechanical shutter 201 is configured to be freely movable so that a photoelectric conversion surface of the image sensor 202 is shielded or exposed. By moving the mechanical shutter 201, the exposure time of the image sensor 202 is adjusted.

The image sensor 202 has the photoelectric conversion surface on which an image of luminous fluxes from a subject condensed via the imaging lens 101 is formed. The photoelectric conversion surface is configured by a plurality of pixels being arranged two-dimensionally. A color filter is provided on the light incidence side of the photoelectric conversion surface. The image sensor 202 as described above converts an image (subject image) formed on the photoelectric conversion surface and corresponding to luminous fluxes into an electric signal (hereinafter, referred to as an image signal) in accordance with the quantity of light thereof and outputs the image signal.

Image sensors configured in various ways such as the CCD scheme and CMOS scheme are known as the image sensor 202. Further, various kinds of array of color filters such as the Bayer array are known as the color array of color filters. In the present embodiment, the configuration of the image sensor 202 is not limited to a specific configuration and image sensors of various configurations can be used.

The analog processing unit 203 performs analog processing such as CDS (correlated double sampling) processing and AGC (automatic gain control) processing on an image signal obtained by the image sensor 202. The A/D conversion unit 204 converts an image signal analog-processed by the analog processing unit 203 into a digital signal (hereinafter, referred to as image data).

The image sensor 202, the analog processing unit 203, and the A/D conversion unit 204 function as an example of the imaging unit.

The bus 205 is a transfer line to transfer various kinds of data generated inside the camera body 200. The frame memory 206 is a storage unit to temporarily store various kinds of data generated inside the camera body 200. Here, the frame memory 206 is, for example, an SDRAM.

The AE processing unit 207 calculates subject brightness using image data. The subject brightness may not only be calculated from image data, but also be measured by, for example, a dedicated photometric sensor. The AF processing unit 208 extracts signals of high-frequency components from image data and adds such signals to acquire a focusing evaluation value for AF.

The image processing unit 209 performs various kinds of image processing on image data. The image processing unit 209 includes a white balance (WB) correction unit 2091, a synchronization processing unit 2092, a color reproduction processing unit 2093 and the like.

The WB correction unit 2091 performs white balance correction processing on image data, which involves multiplication by a gain to correct the color balance of image data. The synchronization processing unit 2092 performs synchronization processing on image data, which involves converting image data in which one pixel in the Bayer array or the like corresponds to one color component into image data in which one pixel corresponds to a plurality of color components. The color reproduction processing unit 2093 performs processing on image data related to color reproduction of an image such as a matrix operation to adjust the hue or saturation.

The image compression/decompression unit 210 performs JPEG or other compression processing on image data obtained by image processing by the image processing unit 209 when an image is recorded. The image compression/decompression unit 210 performs decompression (decode) processing on image data having been compressed when an image is reproduced.

The memory I/F 211 is an interface through which the microcomputer 215 or the like accesses the recording medium 212. The recording medium 212 is a memory card freely removable from, for example, the camera body 200. The recording medium 212 records an image file or the like.

The display driver 213 converts image data obtained by the image processing unit 209 or image data expanded by the image compression/decompression unit 210 into a video signal and outputs the video signal to the display unit 214. The display unit 214 is, for example, a liquid crystal display (LCD). The display unit 214 displays an image based on a video signal input from the display driver 213.

The microcomputer 215 has a function as an imaging controller and controls the operation of the mechanical shutter 201 and the image sensor 202. In addition, the microcomputer 215 controls the operation of each unit of the camera body 200 such as the image processing unit 209 and the display driver 213. The microcomputer 215 also performs AE processing using the subject brightness operated by the AE processing unit 207 or AF processing using the AF evaluation value operated by the AF processing unit 208. When the interchangeable lens 100 is attached, the microcomputer 215 controls the operation of the interchangeable lens 100. Further, the microcomputer 215 in the present embodiment has a function as a standard image decision unit. More specifically, the microcomputer 215 decides standard image data from a plurality of pieces of image data obtained as a result of a plurality of exposures described later.

The operation unit 216 includes various operation members operated by the user. For example, the operation unit 216 includes a release button, power button, and selection key. The release button is an operation unit to instruct execution of a photographing operation. The power button is an operation unit to dictate power-on or power-off of the camera body 200. A portion or all of these buttons may also be configured as a virtual operation unit operated by a touch panel.

The flash memory 217 stores various parameters necessary for operation of the camera body 200 such as parameters necessary for operation of the image processing unit 209; for example, a white balance gain for white balance correction or a color matrix used for processing of color reproduction. In the present embodiment, the flash memory 217 also stores a first noise reduction parameter used for first noise reduction processing and a second noise reduction parameter used for second noise reduction processing described later. Further, the flash memory 217 stores various programs executed by the microcomputer 215.

The motion vector calculation unit 218 as a correlation quantity detection unit calculates a motion vector showing a correlation quantity between the standard image data and each piece of image data excluding the standard image data (hereinafter, referred to as reference image data) of a plurality of pieces of image data obtained by a plurality of exposures described later. The motion vector can be calculated by a well-known method such as a method of using image matching between the standard image data and reference image data.

The vibration sensor 219 is, for example, an angular velocity sensor and detects a vibration generated in the camera body 200 by camera shake or the like. A correlation quality between the standard image data and reference image data can also be detected from output of the vibration sensor 219.

The first combination processing unit 220 combines a plurality of pieces of image data obtained by a plurality of exposures in a photographing operation described later. The second combination processing unit 221 combines standard image data and first combined image data obtained by the combination of the first combination processing unit 220.

The first NR processing unit 222 performs processing to reduce noise superimposed on combined image data obtained by the first combination processing unit 220 in accordance with the first noise reduction parameter stored in the flash memory 217. The second NR processing unit 223 performs processing to reduce noise superimposed on standard image data in accordance with the second noise reduction parameter stored in the flash memory 217. The first NR processing unit 222 and the second NR processing unit 223 can be configured by a general noise reduction processing unit. The first NR processing unit 222 and the second NR processing unit 223 do not necessarily need to reduce noise by the same processing. However, if both units are assumed to reduce noise by the same processing, the apparatus size can be reduced by a method of time-dividing the same processing block or the like.

Next, the operation of the digital camera shown in FIG. 1 will be described with reference to FIG. 2.

FIG. 2 is a flow chart showing a photographing operation of the digital camera as an example of an imaging method according to the first embodiment of the present invention. The digital camera as an example of an imaging apparatus according to the present embodiment can generate image data with a wider dynamic range by performing a plurality of exposures in the photographing operation and combining a plurality of pieces of image data obtained by the plurality of exposures into one piece of image data. The program to perform the photographing operation in FIG. 2 is stored in, for example, the flash memory 217. The microcomputer 215 reads the program to control the photographing operation in FIG. 2.

The photographing operation in FIG. 2 is started by operating the release button in the operation unit 216 by the user. First, the microcomputer 215 makes initial settings (step S201). In the initial settings, the microcomputer 215 initializes the value of a parameter i set to a register (not shown) in the microcomputer 215 to 0. The parameter i is a parameter to count the number of pieces of image data.

Subsequently, the microcomputer 215 reads the value of a parameter m indicating the number of pieces of image data to be combined (step S202). The parameter m may be stored as a fixed value in the flash memory 217 or may be appropriately set by operating the operation unit 216 by the user. After reading the parameter m, the microcomputer 215 performs the AE processing and the AF processing (step S203).

In the AE processing, the microcomputer 215 causes the AE processing unit 207 to calculate subject brightness. Then, the microcomputer 215 decides exposure conditions; for example, an ISO sensitivity Sv, an F-number Av, and a shutter speed Tv that allow an exposure value during exposure to be a predetermined appropriate value (appropriate exposure value) in accordance with the subject brightness calculated by the AE processing unit 207. If the camera body 200 is provided with a face detection unit, the ISO sensitivity, the F-number, and the shutter speed can be decided in the AE processing so that the brightness of a specific face portion is appropriate.

In the AF processing, the microcomputer 215 causes the AF processing unit 208 to acquire a focusing evaluation value. Then, the microcomputer 215 instructs the lens microcomputer 104 to drive the focusing lens of the imaging lens 101 by a fine amount at a time while evaluating the contrast in image data based on the focusing evaluation value acquired by the AF processing unit 208. Then, the microcomputer 215 instructs the lens microcomputer 104 to stop driving the focusing lens when the contrast reaches the maximum value. The AF processing described above is the so-called contrast AF processing. The phase difference AF processing may also be used as the AF processing. If the camera body 200 is provided with a face detection unit, the focusing lens can be driven so that a specific face range comes into focus in the AF processing.

After the AE processing and the AF processing, the microcomputer 215 performs an exposure operation (step S204). At this point, the microcomputer 215 performs the exposure operation in accordance with exposure conditions decided before the exposure operation. More specifically, the microcomputer 215 sets a gain controlled variable (amplification factor) in the analog processing unit 203 in accordance with the ISO sensitivity and sends the F-number decided before the exposure operation to the lens microcomputer 104. Then, the microcomputer 215 controls the exposure value of the image sensor 202 by operating the mechanical shutter 201 in accordance with the shutter speed decided by the exposure operation in synchronization with driving of the diaphragm 102 under the control of the lens microcomputer 104. An image signal output from the image sensor 202 as a result of the exposure operation is converted into image data as a digital signal by going through the analog processing unit 203 and the A/D conversion unit 204. The image data is stored in the frame memory 206 (step S205). At this point, the microcomputer 215 causes, for example, the frame memory 206 to store exposure conditions (the ISO sensitivity Sv, the F-number Av, and the shutter speed Tv).

After the exposure operation is completed, the microcomputer 215 adds 1 to i (step S206). Subsequently, the microcomputer 215 determines whether i is larger than m (step S207).

If i is determined to be equal to m or smaller in the determination in step S207, in other words, it is determined that the set number of pieces of image data to be combined is not yet obtained, the microcomputer 215 changes exposure conditions (step S208). Then, the microcomputer 215 returns the processing to step S204 to perform the next exposure operation in accordance with changed exposure conditions. To obtain image data with a wider dynamic range by combination processing described later, it is necessary to combine a plurality of pieces of image data having different exposure values. To change the exposure value, at least one of the ISO sensitivity, the F-number, and the shutter speed may be changed. If the F-number is changed, the focal length of the imaging lens 101, that is, the photographing field angle also changes. As the ISO sensitivity is increased, the noise quantity also increases. Thus, when exposure conditions are changed, it is desirable to change the shutter speed. The amount of change of the exposure value (shutter speed) for each exposure may be arbitrary. Generally, with a decreasing shutter speed, that is, with an increasing exposure time, the camera shake of the camera body 200 or subject blurring increases. The influence of image blurring caused by such camera shake or subject blurring is reduced by alignment in the combination processing described later.

If i is determined to have exceeded m in the determination in step S207, the microcomputer 215 terminates the exposure operation and decides the standard image data from m pieces of image data stored in the frame memory 206 as a result of m exposures (step S209). Details of the decision processing of the standard image data will be described later.

After deciding the standard image data, the microcomputer 215 performs first combination processing (step S210).

In the first combination processing, the microcomputer 215 detects a motion vector between the standard image data and respective reference image data through the motion vector calculation unit 218. The motion vector may also be detected from the vibration quantity of the camera body 200 detected by the vibration sensor 219. After the motion vector is detected, the microcomputer 215 instructs the first combination processing by inputting the detected motion vector into the first combination processing unit 220. After receiving the instruction, the first combination processing unit 220 aligns and then combines pixels of a plurality of pieces of image data stored in the frame memory 206 using the motion vector. In this case, for example, the reference image data is sequentially combined with the standard image data. For the combination processing, for example, the first combination processing unit 220 adds pixel data corresponding to a plurality of pieces of image data. At this point, the first combination processing unit 220 calculates a difference between data of each pixel of the standard image data and data of the corresponding pixel of the reference image data. Then, the first combination processing unit 220 adds data of pixels for which the absolute value of the calculated difference is equal to or smaller than a predetermined value and does not add data of pixels for which the absolute value of the difference is larger than the predetermined value. Pixels for which the absolute value of the difference is larger than the predetermined value are pixels for which displacements of position with respect to corresponding pixels of the standard image data are large. If such pixels are added, double images may be generated and thus such pixels are not used for addition.

After the addition, the first combination processing unit 220 normalizes the combination result in accordance with the number of pieces of image data added in each pixel position and causes the frame memory 206 to store first combined image data obtained by normalization. The first combination processing unit 220 outputs information indicating the number of added pieces of image data for each pixel position to the second combination processing unit 221.

After the first combination processing, the microcomputer 215 reads the second noise reduction parameter from the flash memory 217 (step S211). The second noise reduction parameter is a noise reduction parameter adjusted by assuming that the parameter is applied to the first combined image data and it is selected in accordance with exposure conditions (ISO sensitivity and so on). The noise reduction strength of the second noise reduction parameter is set weaker than that of the first noise reduction parameter. Typically, the second noise reduction parameter is set in accordance with the reduction of noise quantity on the assumption that all image data are combined in the first combination processing.

After reading the second noise reduction parameter, the microcomputer 215 performs second noise reduction processing (step S212). In the second noise reduction processing, the microcomputer 215 outputs the second noise reduction parameter read from the flash memory 217 to the second NR processing unit 223. After the second noise reduction parameter is input, the second NR processing unit 223 performs noise reduction processing on the first combined image data read from the frame memory 206 by using the second noise reduction parameter.

In parallel with the second noise reduction processing, the microcomputer 215 reads the first noise reduction parameter from the flash memory 217 (step S213). The first noise reduction parameter is a noise reduction parameter adjusted by assuming that the parameter is applied to one piece of image data, and is selected, as for the second noise reduction parameter, in accordance with exposure conditions (such as the IOS sensitivity).

After reading the first noise reduction parameter, the microcomputer 215 performs first noise reduction processing (step S214). In the first noise reduction processing, the microcomputer 215 outputs the first noise reduction parameter read from the flash memory 217 to the first NR processing unit 222. After the first noise reduction parameter is input, the first NR processing unit 222 performs noise reduction processing on the standard image data read from the frame memory 206 by using the first noise reduction parameter.

After the first noise reduction processing and the second noise reduction processing are completed, the microcomputer 215 performs second combination processing (step S215).

For the second combination processing, the microcomputer 215 instructs the second combination processing unit 221 to perform the second combination processing. After receiving the instruction, the second combination processing unit 221 decides the combination ratio of the standard image data and the first combined image data for each pixel in accordance with the information showing the number of added pieces of image data in the first combined image data for each pixel position. The combination ratio of the standard image data is increased for pixels for which the number of combined pieces in the first combined image data is small, that is, noise reduction strength is relatively weak, and the combination ratio of the first combined image data is increased for pixels for which the number of combined pieces in the first combined image data is large, that is, noise reduction strength is relatively strong.

After the combination ratio is decided as described above, the second combination processing unit 221 obtains second combined image data by combining (weighted average) data of each pixel of the standard image data and data of each pixel of the first combined image data and causes the frame memory 206 to store the second combined image data. By obtaining the second combined image data in this manner, each pixel of the second combined image data has come to be subjected to the noise reduction processing with almost the same strength.

After the second combination processing, the microcomputer 215 performs image processing on the second combined image data stored in the frame memory 206 through the image processing unit 209 (step S216). Then, the microcomputer 215 records the second combined image data processed by the image processing unit 209 in the recording medium 212 or causes the display unit 214 to display the image corresponding to the second combined image data (step S217). After the image is recorded or displayed, the microcomputer 215 terminates the processing in the flow chart of FIG. 2.

Figure 3:
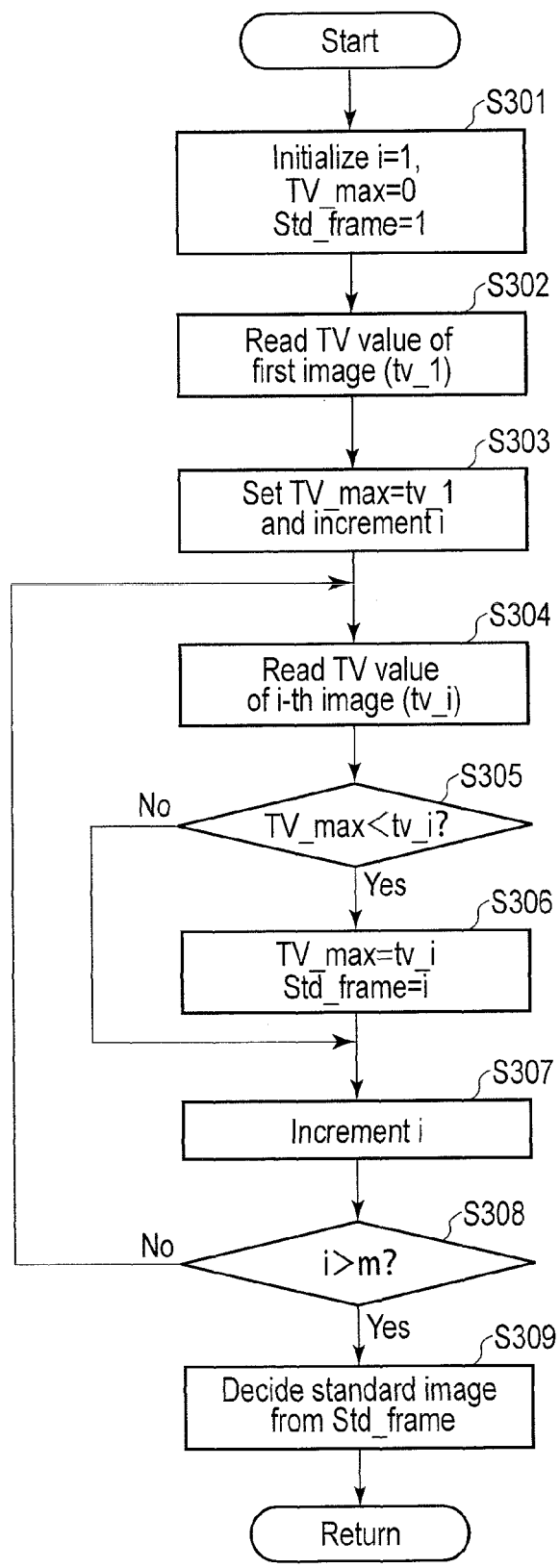
FIG. 3 is a flow chart showing decision processing of standard image data.

FIG. 3 is a flow chart showing decision processing of standard image data. In the present embodiment, among a plurality of pieces of image data obtained by a plurality of exposures, the image data of the shortest length of exposure time, that is, the fastest shutter speed is selected as the standard image data.

In FIG. 3, the microcomputer 215 makes initial settings (step S301). In the initial settings, the microcomputer 215 initializes the value of the parameter i set to a register (not shown) in the microcomputer 215 to 1, the value of TV_max to 0, and the value of Std_frame to 1. The parameter i is a parameter to indicate the number of pieces of image data. TV_max is a parameter indicating the maximum value of the shutter speed. Std_frame is a parameter to show the number of frames of the standard image data.

After the initial settings, the microcomputer 215 reads the shutter speed tv_1 of the first piece of image data (for example, image data obtained by the first exposure) of a plurality of pieces of image data stored in the frame memory 206 from, for example, the frame memory 206 (step S302). Then, the microcomputer 215 sets the value of TV_max to tv_1 and adds 1 to i (step S303).

After setting the value of TV_max, the microcomputer 215 reads the shutter speed tv_i of the i-th piece of image data (for example, image data obtained by the i-th exposure) of the plurality of pieces of image data stored in the frame memory 206 from, for example, the frame memory 206 (step S304). Then, the microcomputer 215 compares the value of TV_max and the value of tv_i to determine whether the value of TV_max is smaller than the value of tv_i (step S305). If the determination in step S305 determines that the value of TV_max is smaller than the value of tv_i, the microcomputer 215 sets the value of TV_max to tv_i and the value of Std_frame to i (step S306). If the determination in step S305 determines that the value of TV_max is equal to or larger than the value of tv_i, the microcomputer 215 skips the processing in step S306.

If the determination in step S305 determines that the value of TV_max is equal to or larger than the value of tv_i or after S306, the microcomputer 215 adds 1 to i (step S307). Subsequently, the microcomputer 215 determines whether i is larger than m (step S308). If the determination in step S308 determines that i is equal to or smaller than m, the microcomputer 215 returns the processing to step S304.

If the determination in step S308 determines that i has exceeded m, the microcomputer 215 decides the image data of the frame indicated by the value of Std_frame at that point as the standard image data (step S309). Then, the microcomputer 215 terminates the processing in the flow chart of FIG. 3.

In the present embodiment, as described above, image data obtained with an exposure of the shortest length of exposure time is selected as the standard image data to be used as a standard for alignment in combination processing. If the length of exposure time is the shortest, the influence of camera shake or subject blurring is considered to be the lowest. By selecting such image data as the standard image data, an image which is subjected to the influence of image blurring caused by camera shake or subject blurring less and has high quality and a wider dynamic range can be provided to the user.

In FIG. 2, noise reduction processing is performed while a plurality of pieces of image data are combined. However, the noise reduction processing is not mandatory in the present embodiment.

The combination method of image data is not limited to the above method. In the example in FIG. 2, for example, the combination processing is performed before the image processing by the image processing unit 209; however, for example, after the image processing by the image processing unit 209, for example, after synchronization processing, the combination processing may be performed. In addition, the technology according to the present embodiment can be applied to various kinds of combination processing in which the standard image data is decided from among a plurality of pieces of image data obtained by a plurality of exposures and alignment is performed using the standard image data as a standard.

[Second Embodiment]

Next, the second embodiment of the present invention will be described. In the first embodiment, the standard image data is decided after performing a plurality of exposures. In contrast, the second embodiment is an example in which the decision processing of the standard image data is made unnecessary by establishing a predetermined order in changes of the exposure value. The configuration of a digital camera as an example of an imaging apparatus according to the second embodiment may be the same as that in FIG. 1. Therefore, a detailed description thereof is omitted.

Figure 4:
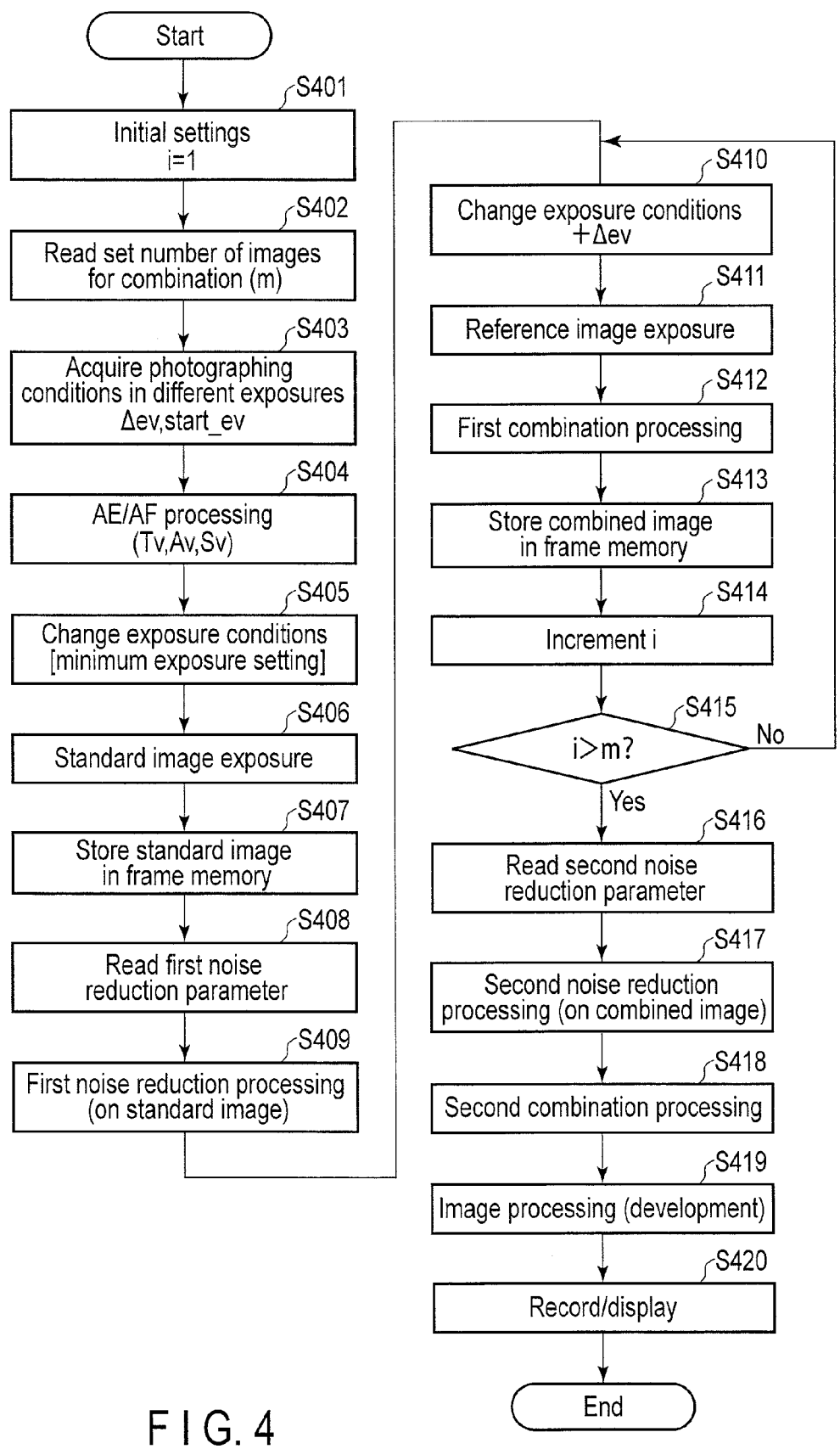
FIG. 4 is a flow chart showing a first example of the photographing operation of the digital camera as an imaging method according to a second embodiment of the present invention.

FIG. 4 is a flow chart showing a first example of the photographing operation of the digital camera as an imaging method according to the second embodiment of the present invention. In FIG. 4, a microcomputer 215 makes the same initial settings as in the first embodiment (step S401). In the initial settings, the microcomputer 215 initializes the value of a parameter i set to a register (not shown) in the microcomputer 215 to 0.

Subsequently, the microcomputer 215 reads the value of a parameter m indicating the number of pieces of image data to be combined (step S402). After reading the parameter m, the microcomputer 215 acquires parameters $\Delta ev$, start_ev to decide each exposure value of a plurality of exposures (step S403). $\Delta ev$ is a parameter indicating the amount of change of the exposure value. start_ev is a parameter indicating a difference between the exposure value in the first exposure and the appropriate exposure value. In this example, the first exposure value is set so as to be the minimum exposure value of the plurality of exposures. The values of Δev, start_ev may be stored as fixed values in flash memory 217 or the values may be set by operating an operation unit 216 by the user.

After acquiring Δev, start_ev, the microcomputer 215 performs AE processing and AF processing (step S404). The AE processing and the AF processing may be the same as that in the first embodiment.

After the AE processing and the AF processing, the microcomputer 215 changes exposure conditions (step S405). In this example, the exposure value in the initial exposure is made the smallest. As described above, the exposure value is changed by changing the shutter speed. Thus, in step S405, while the ISO sensitivity and the F-number calculated for the appropriate exposure value are fixed, the exposure value is set to (appropriate exposure value—start_ev) by changing the shutter speed. Image data under exposure conditions changed as described above becomes the image data with the shortest length of exposure time. Thus, in this example, the image data obtained in the initial exposure is used as the standard image data.

After changing exposure conditions in step S405, the microcomputer 215 performs an exposure operation according to the exposure conditions decided in step S405 (step S406). An image signal output from an image sensor 202 as a result of the exposure operation is converted into image data as a digital signal by going through an analog processing unit 203 and an A/D conversion unit 204. The image data is stored in a frame memory 206 as standard image data (step S407). At this point, the microcomputer 215 causes, for example, the frame memory 206 to store the exposure conditions (the ISO sensitivity Sv, the F-number Av, and the shutter speed Tv).

After acquiring the standard image data, the microcomputer 215 reads a first noise reduction parameter from the flash memory 217 (step S408). After reading the first noise reduction parameter, the microcomputer 215 performs first noise reduction processing (step S409). After the first noise reduction processing is completed, the microcomputer 215 changes exposure conditions (step S410). In this processing, the microcomputer 215 changes the value of the shutter speed so that the changed exposure value is (original exposure value+Δev). That is, the value of the shutter speed is slowed by Δev from the original value. Subsequently, the microcomputer 215 performs an exposure operation in accordance with changed exposure conditions (step S411).

After the exposure operation for reference image data is completed, the microcomputer 215 performs first combination processing (step S412). Combined image data combined by the first combination processing is stored in the frame memory 206 (step S413).

After the first combination processing is completed, the microcomputer 215 adds 1 to i (step S414). Subsequently, the microcomputer 215 determines whether i is larger than m (step S415). If the determination in step S415 determines that i is equal to or smaller than m, the microcomputer 215 changes exposure conditions by returning the processing to step S410 to perform an exposure operation for the next reference image data.

Thus, in the present example, the first combination processing is performed every time one exposure for reference image data is completed. In this case, pieces of reference image data are combined one after another. In contrast, as in the first embodiment, the first combination processing may be performed after all of the set number of pieces of image data to be combined are obtained.

If the determination in step S415 determines that i has exceeded m, the microcomputer 215 reads a second noise reduction parameter from the flash memory 217 (step S416). Then, the microcomputer 215 performs second noise reduction processing (step S417).

After the second noise reduction processing is completed, the microcomputer 215 performs second combination processing (step S418). After the second combination processing, the microcomputer 215 performs image processing on the second combined image data stored in the frame memory 206 through an image processing unit 209 (step S419). Then, the microcomputer 215 records the second combined image data processed by the image processing unit 209 in a recording medium 212 or causes a display unit 214 to display the image corresponding to the second combined image data (step S420). After the image is recorded or displayed, the microcomputer 215 terminates the processing in the flow chart of FIG. 4.

In the present example, as described above, the length of exposure time in the initial exposure of a plurality of exposures for combination processing is made the shortest. In this case, image data to be the standard image data is fixed and thus, the decision processing of the standard image data as in the first embodiment is not needed. Moreover, by using the image data obtained by the initial exposure as the standard image data, the release time lag can be minimized.

Figure 5:
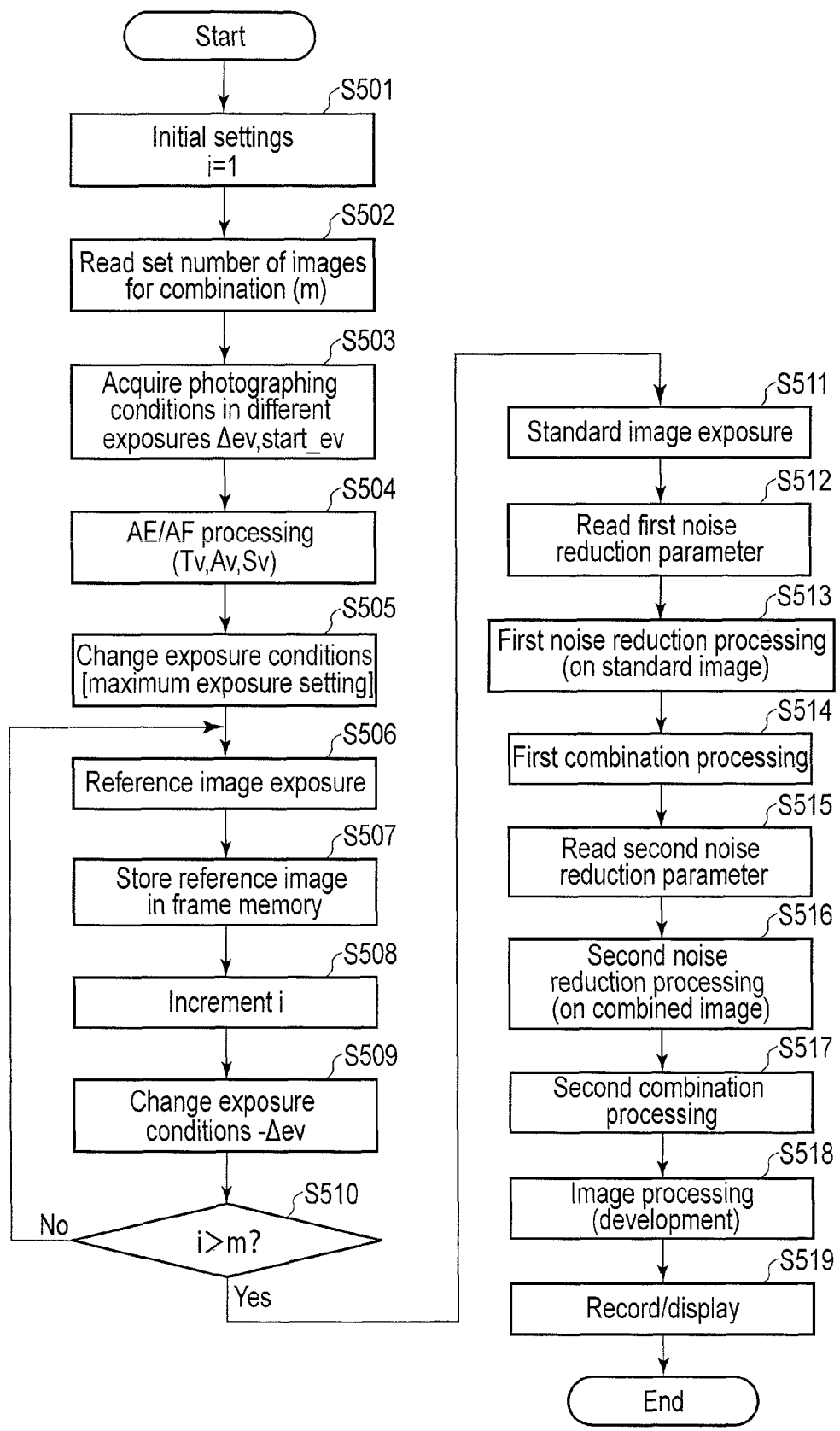
FIG. 5 is a flow chart showing a second example of the photographing operation of the digital camera as the imaging method according to the second embodiment of the present invention.

FIG. 5 is a flow chart showing a second example of the photographing operation of the digital camera as the imaging method according to the second embodiment of the present invention. In FIG. 5, the microcomputer 215 makes the same initial settings as in the first embodiment (step S501). In the initial settings, the microcomputer 215 initializes the value of the parameter i set to a register (not shown) in the microcomputer 215 to 0.

Subsequently, the microcomputer 215 reads the value of the parameter m indicating the number of pieces of image data to be combined (step S502). After reading the parameter m, the microcomputer 215 acquires parameters Δev, start_ev to decide each exposure value of a plurality of exposures (step S503). Δev is a parameter indicating the amount of change of the exposure value. start_ev is a parameter indicating a difference between the exposure value in the initial exposure and the appropriate exposure value. In the present example, a first exposure value is set so as to be the maximum exposure value of the plurality of exposures. The values of Δev, start_ev may be set as fixed values in the flash memory 217 or they may be set by operating the operation unit 216 by the user.

After acquiring Δev, start_ev, the microcomputer 215 performs AE processing and AF processing (step S504). The AE processing and the AF processing may be the same as in the first embodiment.

After the AE processing and the AF processing, the microcomputer 215 changes exposure conditions (step S505). In the present example, the exposure value in the initial exposure is made the largest. As described above, the exposure value is changed by changing the shutter speed. Thus, in step S505, while the ISO sensitivity and the F-number calculated for the appropriate exposure value are fixed, the exposure value is set to (appropriate exposure value+start_ev) by changing the shutter speed.

After changing exposure conditions in step S505, the microcomputer 215 performs an exposure operation according to the exposure conditions decided in step S505 (step S506). An image signal output from the image sensor 202 as a result of the exposure operation is converted into image data as a digital signal by going through the analog processing unit 203 and the A/D conversion unit 204. The image data is stored in the frame memory 206 as reference image data (step S507). At this point, the microcomputer 215 causes, for example, the frame memory 206 to store the exposure conditions (the ISO sensitivity Sv, the F-number Av, and the shutter speed Tv).

After the exposure operation for reference image data is completed, the microcomputer 215 adds 1 to i (step S508). Subsequently, the microcomputer 215 changes exposure conditions (step S509). In this processing, the microcomputer 215 changes the value of the shutter speed so that the changed exposure value is (original exposure value—Δev). That is, the value of the shutter speed is increased by Δev from the original value. Subsequently, the microcomputer 215 determines whether i is larger than m (step S510). If the determination in step S510 determines that i is equal to or smaller than m, the microcomputer 215 changes exposure conditions by returning the processing to step S506 to perform an exposure operation for the next piece of image data. If the determination in step S510 determines that i is larger than m, the microcomputer 215 changes exposure conditions to perform an exposure operation for the next piece of image data (step S511). In the second example, image data obtained in the last exposure operation becomes the image data with the shortest length of exposure time. Thus, in the present example, the image data obtained in the last exposure is used as the standard image data.

After acquiring the standard image data, the microcomputer 215 reads the first noise reduction parameter from the flash memory 217 (step S512). After reading the first noise reduction parameter, the microcomputer 215 performs first noise reduction processing (step S513).

After performing the first noise reduction processing, the microcomputer 215 performs first combination processing (step S514). After the first combination processing, the microcomputer 215 reads the second noise reduction parameter from the flash memory 217 (step S515). After reading the second noise reduction parameter, the microcomputer 215 performs second noise reduction processing (step S516).

After the first noise reduction processing and the second noise reduction processing are completed, the microcomputer 215 performs second combination processing (step S517). After the second combination processing, the microcomputer 215 performs image processing on the second combined image data stored in the frame memory 206 through the image processing unit 209 (step S518). Then, the microcomputer 215 records the second combined image data processed by the image processing unit 209 in the recording medium 212 or causes the display unit 214 to display the image corresponding to the second combined image data (step S519). After the image is recorded or displayed, the microcomputer 215 terminates the processing in the flow chart of FIG. 5.

In the present example, as described above, the length of exposure time in the last exposure of a plurality of exposures for combination processing is made the shortest. In this case, image data to be the standard image data is fixed and thus, the decision processing of the standard image data as in the first embodiment is not needed. Moreover, by using the image data obtained by the last exposure as the standard image data, a naturally descriptive image as if a so-called rear-curtain synchronous photographing is performed can be generated.

In the second combination processing of each embodiment described above, double images are inhibited from arising by not using pixels having much blurring with respect to the standard image data for combination. Then, differences in quality based on a strength difference of noise reduction processing due to a difference in the number of pieces of image data used for combination for each pixel are compensated for by changing the combination ratio of the noise reduced standard image data and noise reduced first combined image data for each pixel. However, in actual practice, a slight quality difference still arises. To completely eliminate such a quality difference, a method of making the number of combined pieces of first combined image data equal for each pixel, in other words, a method of ignoring image blurring can be considered. The second example is particularly effective when image data is combined by ignoring such image blurring.

The present invention has been described based on the above embodiments, but the present invention is not limited to the above embodiments and various modifications can be made or various applications can be found within the scope of the present invention. Operations of each flow chart described above do not necessarily mean that operations need to be performed in the above order. Further, in the description of the above embodiments, processing by hardware is assumed as processing performed by an image processing unit, but there is no need to be limited to such a configuration. For example, a configuration of processing by software separately is also possible.

Further, the above embodiments include various stages of invention and various inventions can be extracted by appropriately combining a plurality of disclosed constituent features. For example, if problems as described above can be solved even if some constituent features are eliminated from all constituent features shown in an embodiment, and if effects as described above can be obtained, a configuration from which such constituent features are eliminated may also be extracted as an invention.

What is claimed is:

1. An imaging apparatus comprising:
    an imaging unit that obtains image data by photoelectrically converting light received through an imaging lens;
    an imaging controller that controls the imaging unit to obtain a plurality of pieces of image data having different exposure values by causing the imaging unit to successively perform a plurality of exposures in a plurality of different lengths of exposure time;
    a standard image decision unit that decides one piece of image data from the plurality of pieces of image data having different exposure values as standard image data;
    a correlation quantity detection unit that detects a correlation quantity between the standard image data and the image data of the plurality of pieces of image data having different exposure values excluding the standard image data;
    a first combination processing unit that generates first combined image data by combining the plurality of pieces of image data having different exposure values in accordance with the correlation quantity detected by the correlation quantity detection unit by using the standard image data decided by the standard image decision unit as a standard; and
    a second combination processing unit that combines the standard image data and the first combined image data,
    wherein the standard image decision unit decides the image data with the shortest length of exposure time of the plurality of pieces of image data having different exposure values as the standard image data.

2. The imaging apparatus according to claim 1,
    wherein the imaging controller exercises control so that the imaging unit is caused to perform the plurality of exposures in ascending order of the exposure time and
    the standard image decision unit decides the image data obtained by the imaging unit in an initial exposure as the standard image data.

3. The imaging apparatus according to claim 1,
wherein the imaging controller exercises control so that the imaging unit is caused to perform the plurality of exposures in descending order of the exposure time and
the standard image decision unit decides the image data obtained by the imaging unit in a last exposure as the standard image data.

4. An imaging method comprising:
obtaining a plurality of pieces of image data having different exposure values by causing an imaging unit to successively perform a plurality of exposures in a plurality of different lengths of exposure times by an imaging controller;
deciding the image data with the shortest length of exposure time of the plurality of pieces of image data having different exposure values obtained by the imaging unit as standard image data by a standard image decision unit;
detecting a correlation quantity between the standard image data and the image data of the plurality of pieces of image data having different exposure values excluding the standard image data by a correlation quantity detection unit;
generating first combined image data by combining the plurality of pieces of image data having different exposure values in accordance with the correlation quantity detected by the correlation quantity detection unit by using the standard image data decided by the standard image decision unit as a standard by a first combination processing unit; and
combining the standard image data and the first combined image data by a second combination processing unit.

* * * * *